United States Patent
Madonna et al.

(10) Patent No.: US 8,199,113 B2
(45) Date of Patent: Jun. 12, 2012

(54) PROGRAMMABLE ON SCREEN DISPLAY AND REMOTE CONTROL

(75) Inventors: Robert P. Madonna, Osterville, MA (US); Kevin C. Kicklighter, Centerville, MA (US); Gerald W. Shields, Wilton, NH (US); Michael C. Silva, East Sandwich, MA (US); Michael E. Noonan, Sandwich, MA (US)

(73) Assignee: Savant Systems, LLC, Hyannis, MA (US)

( * ) Notice: Subject to any disclaimer, the term of this patent is extended or adjusted under 35 U.S.C. 154(b) by 919 days.

(21) Appl. No.: 11/687,458

(22) Filed: Mar. 16, 2007

(65) Prior Publication Data

US 2008/0158148 A1 Jul. 3, 2008

Related U.S. Application Data

(63) Continuation-in-part of application No. 11/520,215, filed on Sep. 13, 2006, now Pat. No. 7,930,644.

(51) Int. Cl.
G06F 3/02 (2006.01)
H04N 5/50 (2006.01)
H03K 17/94 (2006.01)

(52) U.S. Cl. .......... 345/172; 345/169; 348/734; 341/22

(58) Field of Classification Search ................ 345/156, 345/168–169, 172–173, 184; 348/734; 341/21–23
See application file for complete search history.

(56) References Cited

U.S. PATENT DOCUMENTS

| | | | |
|---|---|---|---|
| 5,450,079 A * | 9/1995 | Dunaway | 341/23 |
| 6,266,098 B1 | 7/2001 | Cove et al. | |
| 6,313,880 B1 * | 11/2001 | Smyers et al. | 348/552 |
| 6,469,633 B1 * | 10/2002 | Wachter | 340/825.69 |
| 7,330,189 B2 * | 2/2008 | Nichogi et al. | 345/589 |
| 2003/0035010 A1 | 2/2003 | Kodosky et al. | |
| 2003/0088852 A1 | 5/2003 | Lacas et al. | |
| 2003/0103088 A1 * | 6/2003 | Dresti et al. | 345/835 |
| 2003/0151538 A1 * | 8/2003 | Escobosa et al. | 341/176 |
| 2004/0143349 A1 | 7/2004 | Roberts et al. | |

FOREIGN PATENT DOCUMENTS

| | | |
|---|---|---|
| WO | WO 00/17737 | 3/2000 |
| WO | WO 03/019560 A2 | 3/2003 |
| WO | WO 03/044625 A2 | 5/2003 |

OTHER PUBLICATIONS

International Search Report for PCT/US2008/003434 mailed Sep. 19, 2008, 12 pages.
International Search Report for PCT/US2007/019912 mailed May 13, 2008, 18 pages.
National Instruments Corporation: "Labview User Manual passage" Labview User Manual, Jul. 2000, pp. 1-7.

* cited by examiner

Primary Examiner — Lun-Yi Lao
Assistant Examiner — Jarurat Suteerawongsa
(74) Attorney, Agent, or Firm — Cesari and McKenna, LLP (57) ABSTRACT

Both an on screen display and a physical programmable remote control have buttons whose functionality may be dynamically reassigned in accordance with a user's navigation through menu levels, states or across different services. The physical programmable remote control, in conjunction with a TV or other video display, provides an intuitive, heads up experience for the user and eliminates the need for multiple physical remote controls. User profiles and zones may be used to customize a user's remote control functionality based on preferences, access controls, location and the like.

16 Claims, 12 Drawing Sheets

PROGRAMMABLE ON SCREEN DISPLAY AND REMOTE CONTROL

RELATED CASES

The present application is a continuation-in-part of commonly assigned U.S. patent application Ser. No. 11/520,215, which was filed on Sep. 13, 2006 now U.S. Pat. No. 7,930,644, assigned to a common assignee for PROGRAMMING ENVIRONMENT AND METADATA MANAGEMENT FOR PROGRAMMABLE MULTIMEDIA CONTROLLER and is hereby incorporated by reference.

This application is related to the following copending U.S. patent applications: SYSTEM AND METHOD FOR A PROGRAMMABLE MULTIMEDIA CONTROLLER, filed Dec. 20, 2005 and assigned Ser. No. 11/314,664, PROGRAMMABLE MULTIMEDIA CONTROLLER WITH PROGRAMMABLE SERVICES, filed Dec. 20, 2005 and assigned Ser. No. 11/314,112, both of which are assigned to a common assignee and all of which are expressly incorporated herein by reference.

BACKGROUND OF THE INVENTION

1. Field of the Invention

The present invention relates generally to a programmable on screen display and programmable remote control through which a user may command the operations of a programmable multimedia controller or other device.

2. Background Information

A now decades long expansion in the number and types of consumer electronic devices has generated pervasive use of radiofrequency (RF) and infrared (IR) remote controls. Originally developed for television, remote controls now accompany essentially every CD player, DVD player, audio receiver, TV, home theatre, camcorder and portable radio. To simply play a DVD and watch a movie on a TV, it may be necessary to operate three different remote controls in order to turn on and properly set the TV, DVD player and home theatre system for the performance.

One conventional approach to eliminating or reducing the number of physical remote controls is the so-called universal remote control. In general, a universal remote control works by "learning" the RF or IR signals to which various devices respond. Once the signals are learned and retained in memory, the universal remote control may control multiple devices.

Universal remote controls, however, present certain disadvantages beginning with a dizzying array of physical buttons, perhaps dozens, which are often marked with arcane, difficult to read labels. Due to the number of buttons, they are often so small they are difficult and annoying to use. Further, the physical layout of the buttons does not conform to any industry standard nor to an arrangement that most users find intuitive or even familiar. In addition, because of the small button size and counterintuitive layout, most users cannot operate a universal remote control by touch in a "heads up" manner but must instead frequently look down at the buttons to ensure the correct one is pressed. This represents a recurring, frustrating distraction for many users. Lastly, a conventional universal remote control has no capability to change its functionality based on different users' preferences, handicaps or other factors.

SUMMARY OF THE INVENTION

In brief summary, the present invention provides both a programmable on screen display and a programmable remote control through which a user may command the operations of a multimedia controller or other device. Through a graphical programming environment, the function of each button in the programmable on screen display or physical button on the programmable remote control may be easily assigned or modified. A button's assigned function may vary by individual user to accommodate personal preferences, handicaps, parental controls or other factors. Similarly, a button's assigned function may vary according to a physical zone in which the user is present when using the button.

In accordance with one aspect of the invention, a button's assigned function is dynamically changed to provide appropriate functionality for the type of service that a user has selected. Similarly, a button's assigned functionality may dynamically change in response to a menu level or state to which a user has navigated within a service. Thus, for example, as a user progressively accesses different services, the same button's functionality may dynamically change from "up channel" (while controlling a cable TV converter box), to "initiate call" (while controlling video chat), to "dimmer" (while controlling a lighting system) to any of a number of other desired functionality.

The present invention provides numerous advantages including eliminating the need for separate remote controls for various components that are interconnected with the multimedia controller. The present invention effectively enables a simple remote control, having a small number of large buttons, into a robust, powerful remote control which is intuitively and easily operated in a heads up fashion.

Another advantage of the present invention is that it may effectively replace an expensive, bulky and nonportable touchscreen. Further, the programmable remote control provided by the present invention is sufficiently inexpensive that every member of a household may have one, each of which may be customized in terms of functionality, permitted access to services, preferences and the like.

BRIEF DESCRIPTION OF THE DRAWINGS

The invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1A:
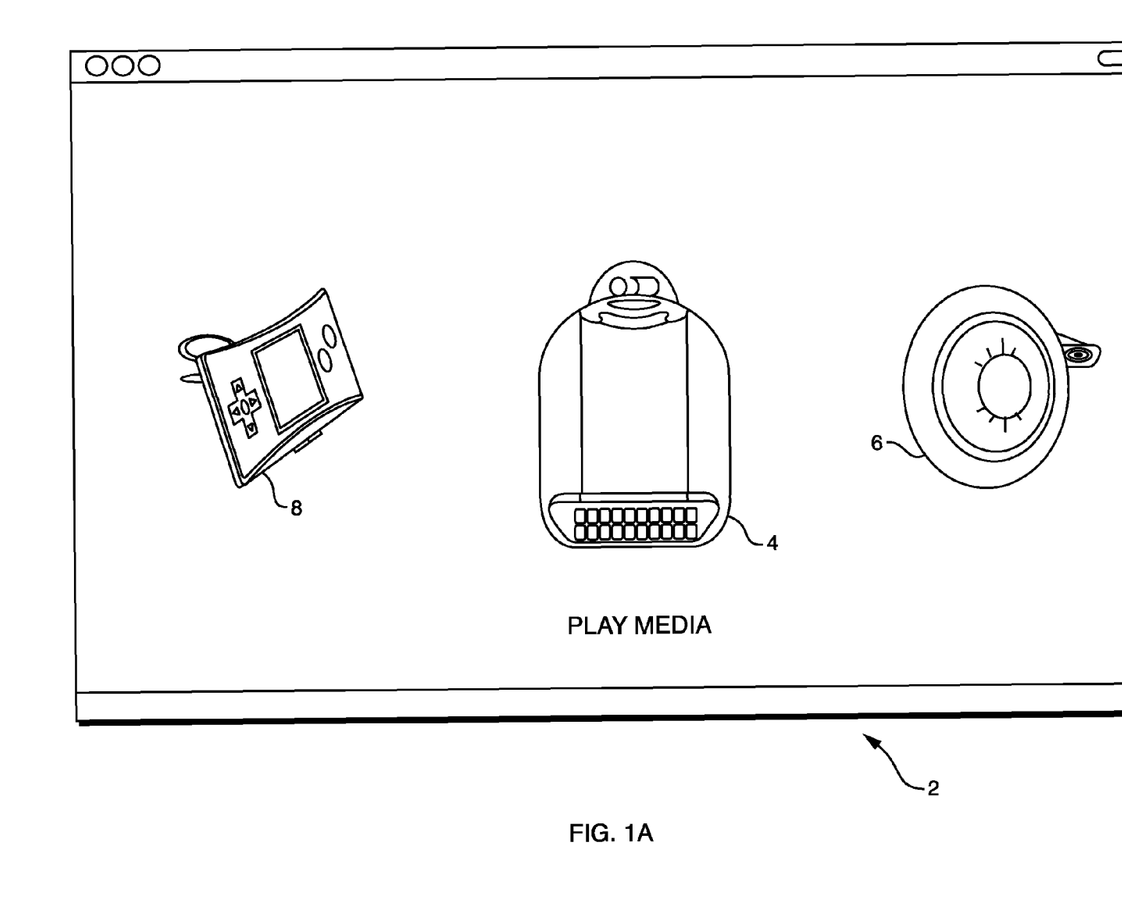
FIGS. 1A-1D show a series of on screen displays in which a rotating selection of programmable buttons, in the form of icons representing different available services, are presented to a user who may use the buttons to command a programmable multimedia controller, according to an illustrative embodiment of the present invention.

FIG. 1A shows an on screen display 2 for a programmable multimedia controller (not shown) or other device in which a rotating selection of programmable buttons are presented to a user (not shown). Details regarding the structure, operation and services which may be performed by the programmable multimedia controller are set forth in the above-referenced related applications. Also, for purposes of clarity, video images, graphics and other content are omitted from on screen display 2, but it should be understood that such content may be displayed on the screen along with the on screen buttons using, for example, the system and methods described in copending application entitled "System and Method for Mixing Graphics with Video Images" filed concurrently herewith and assigned to a common assignee.

When pressed, button 4, which appears as an icon of an old-fashioned diner music selector, will cause the programmable multimedia controller to initiate a "Play Media" service. Such a service may, for example, allow a user to play CDs, DVDs, MP3 files or other media. Button 6, which appears as an icon of a thermostat, will when pressed cause the multimedia controller to initiate an HVAC service through which room temperature may be controlled. Button 8, which appears as an icon of a game controller, will cause the multimedia controller to initiate a video game service.

Figure 1B:
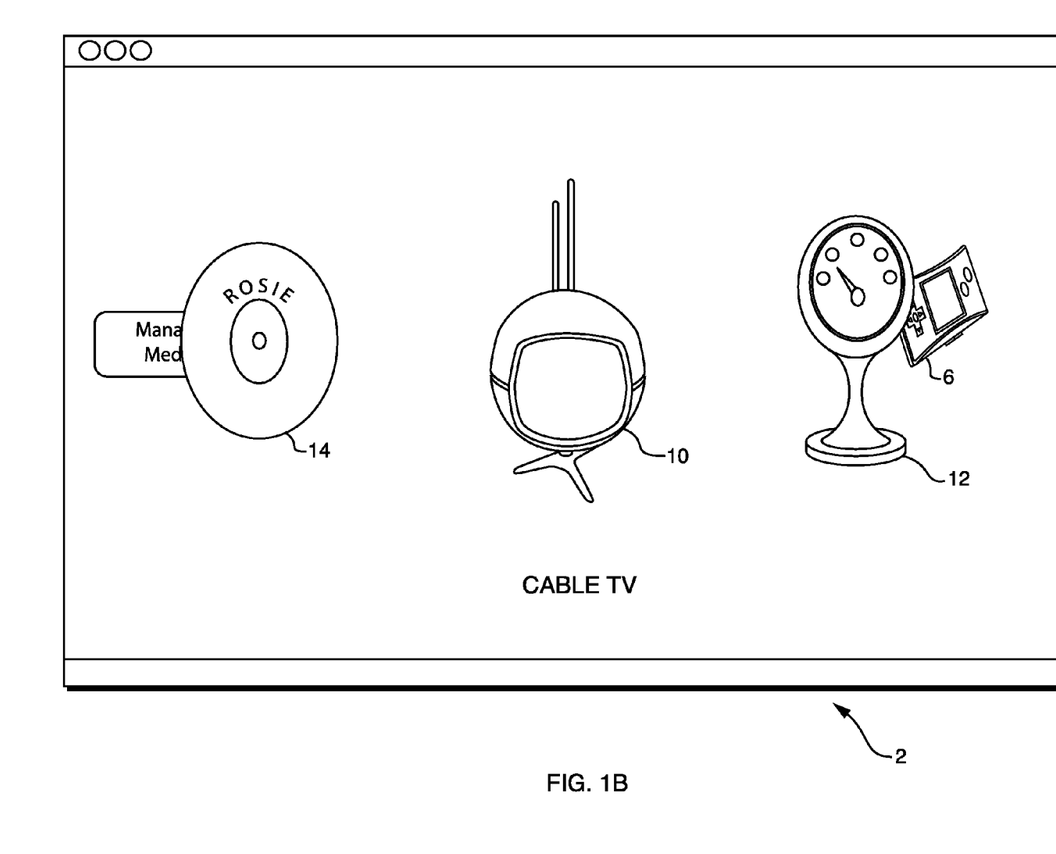

Other buttons representing other available services are shown in FIG. 1B. For example, a button 10, which appears as an icon of a TV, will when pressed cause the multimedia controller to initiate a cable TV service. Button 12, which appears as an icon of a widget, will when pressed initiate displaying Mac-based widgets on the screen. Button 14, which appears as an icon of a compact disk (CD), will when pressed initiate a CD playing service. Also, it may be seen in FIG. 1B that button 8 has rotated three positions to the right from where it appears in FIG. 1A.

Figure 2:
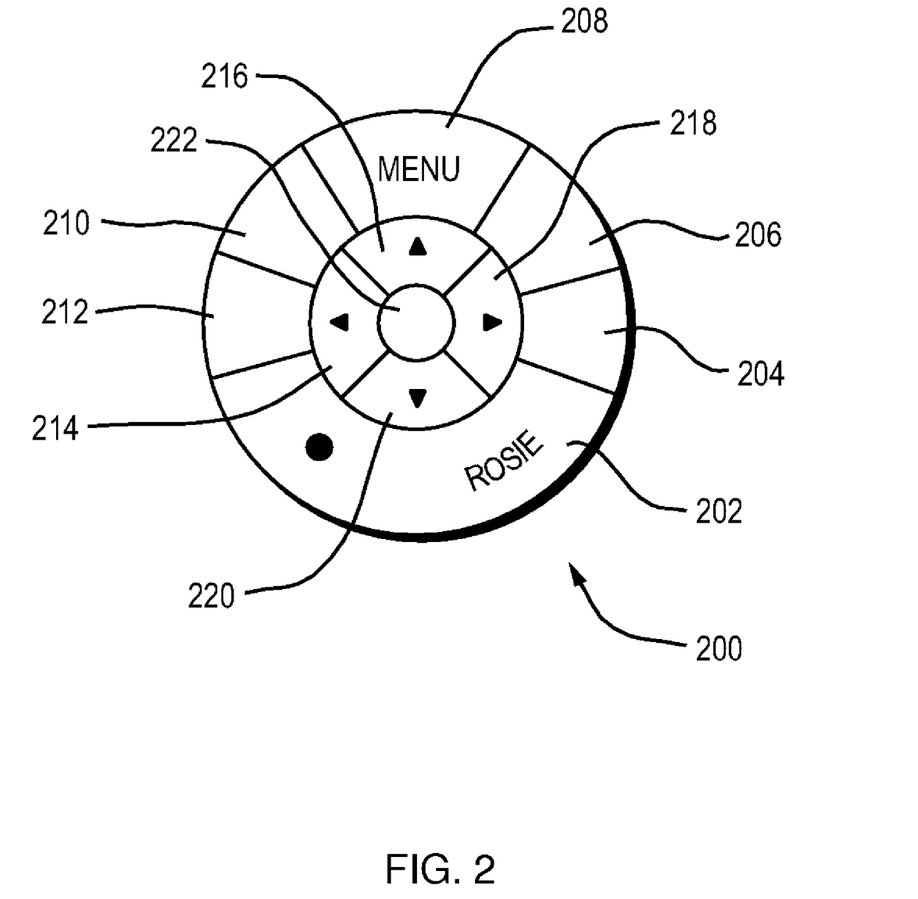
FIG. 2 is a top plan view of a programmable remote control according to an illustrative embodiment of the present invention.

In a preferred embodiment, buttons 4-14, as well as others that may be present, rotate on screen display 2 in response to a user action such as pressing a button or applying pressure to a scroll ring on a remote control, like that shown in FIG. 2, or taking some other action. When a user wishes to "press" one of the on screen buttons 4-14, he or she simply rotates the on screen buttons until the desired one appears in the front and center position (e.g., button 4 in FIG. 1A or button 10 in FIG. 1B) in on screen display 2. At that point, the user may "press" the on screen button by pressing an appropriate button on a remote control, by touching the corresponding area if a touchscreen is being used, or by any of a number of other actions.

Figure 1C:
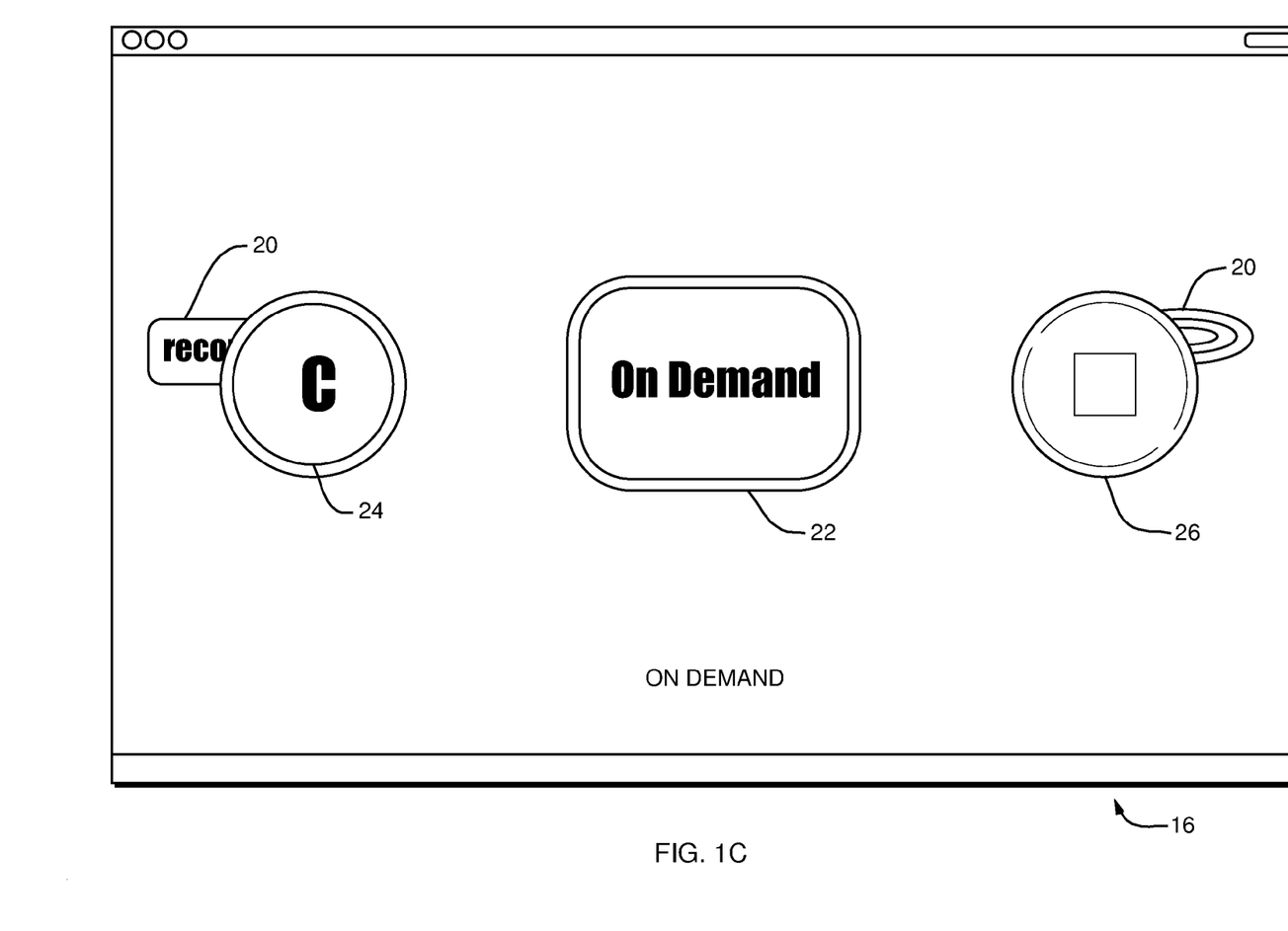

FIG. 1C shows an on screen display 16 which might appear, for example, in response to a user pressing on screen button 10 (FIG. 1B) to initiate a cable TV service. That is, on screen display 16 may be considered, in a hierarchical sense, as a submenu or sublayer with respect to button 10 of on screen display 2. Three on screen buttons 22, 24 and 26 are displayed, each assigned functionality that is appropriate for user control of cable TV. Pressing button 22, for example, initiates access to "on demand" movies or other content available from a cable TV provider. Pressing button 24 initiates a cable service provider's "C" button and pressing button 26 initiates a cable TV converter box's DVR "stop" command. As before, additional buttons (two of which are partially visible at reference number 20) may also be included in a rotating selection.

Figure 1D:
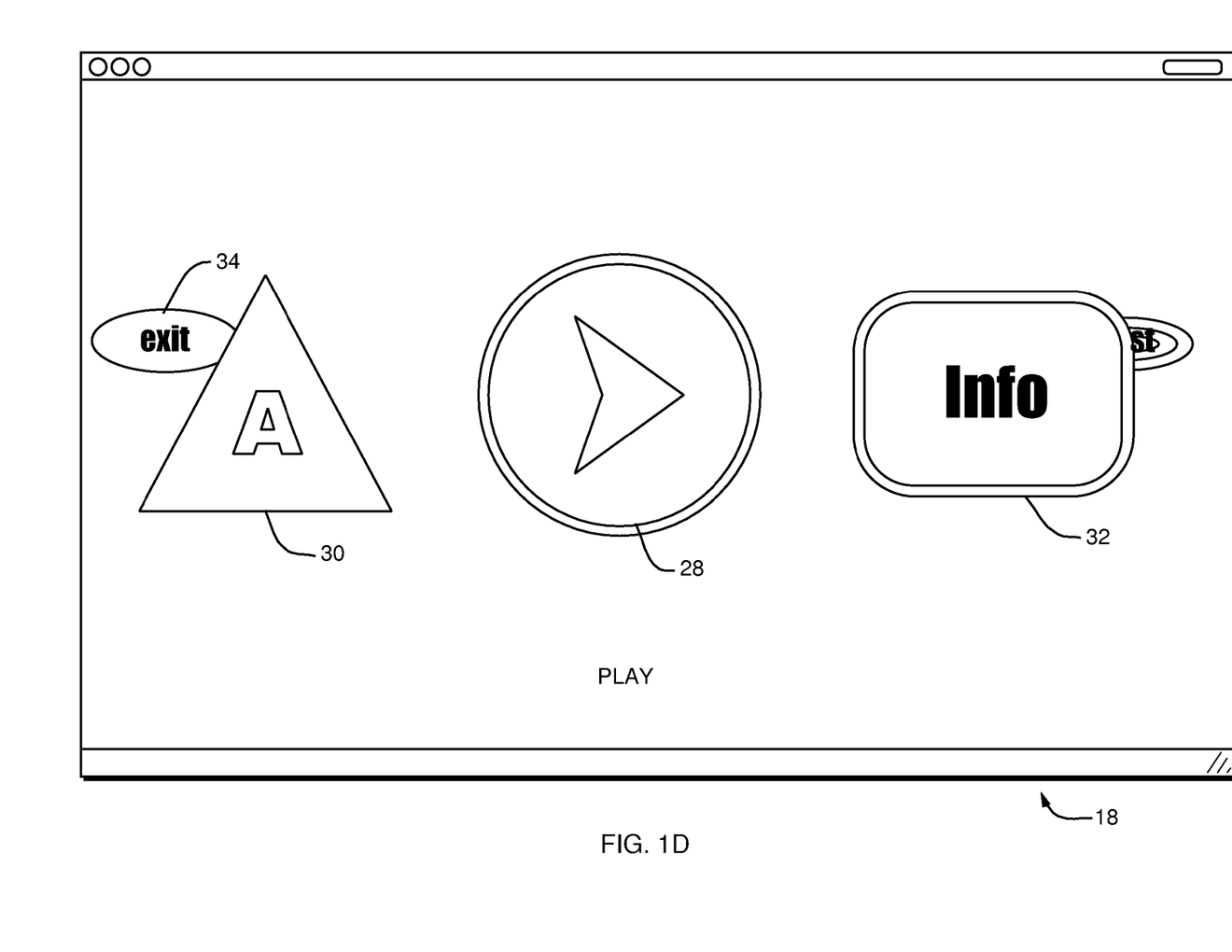

FIG. 1D shows an on screen display 18 which might appear, for example, in response to a user pressing a button to initiate a satellite TV service. Button 28, when pressed, initiates the cable service provider's "play" button. Button 30 when pressed initiates the cable service provider's "A" button. Button 32, when pressed, initiates access to the cable service provider's "info" button. Pressing button 34 initiates the cable service provider's "exit" functionality, which typically is used when in "guide" mode.

FIG. 2 shows a preferred embodiment of a programmable remote control 200 which may be used to rotate or press the on screen display buttons of FIGS. 1A-1B as well as otherwise command the operations of a programmable multimedia controller or other device. In top plan view, remote control 200 includes a rest 202, five outer buttons 204, 206, 208, 210 and 212, and four inner buttons 214, 216, 218 and 220. Remote control 200 also includes a central select button 222. For simplicity, buttons 204-222 may be referred to individually or collectively herein as "physical buttons".

In operation, a user using remote control 200 may, in conjunction with a TV or other video display, command the operations of a multimedia controller or other device in a heads up fashion with the user looking generally at the display and not at remote control 200. For example, by pressing button 208, a user may cause on screen buttons of FIG. 1A to rotate in one direction. By pressing in a circular motion around outer buttons 204-212, the user may cause on screen buttons to rotate in the opposite direction. By pressing button 222, a user may effectively "press" whichever one of on screen buttons 4-14 is displayed in the front and center position on the screen, thereby initiating whatever service or action is assigned to that on screen button.

Figure 3:
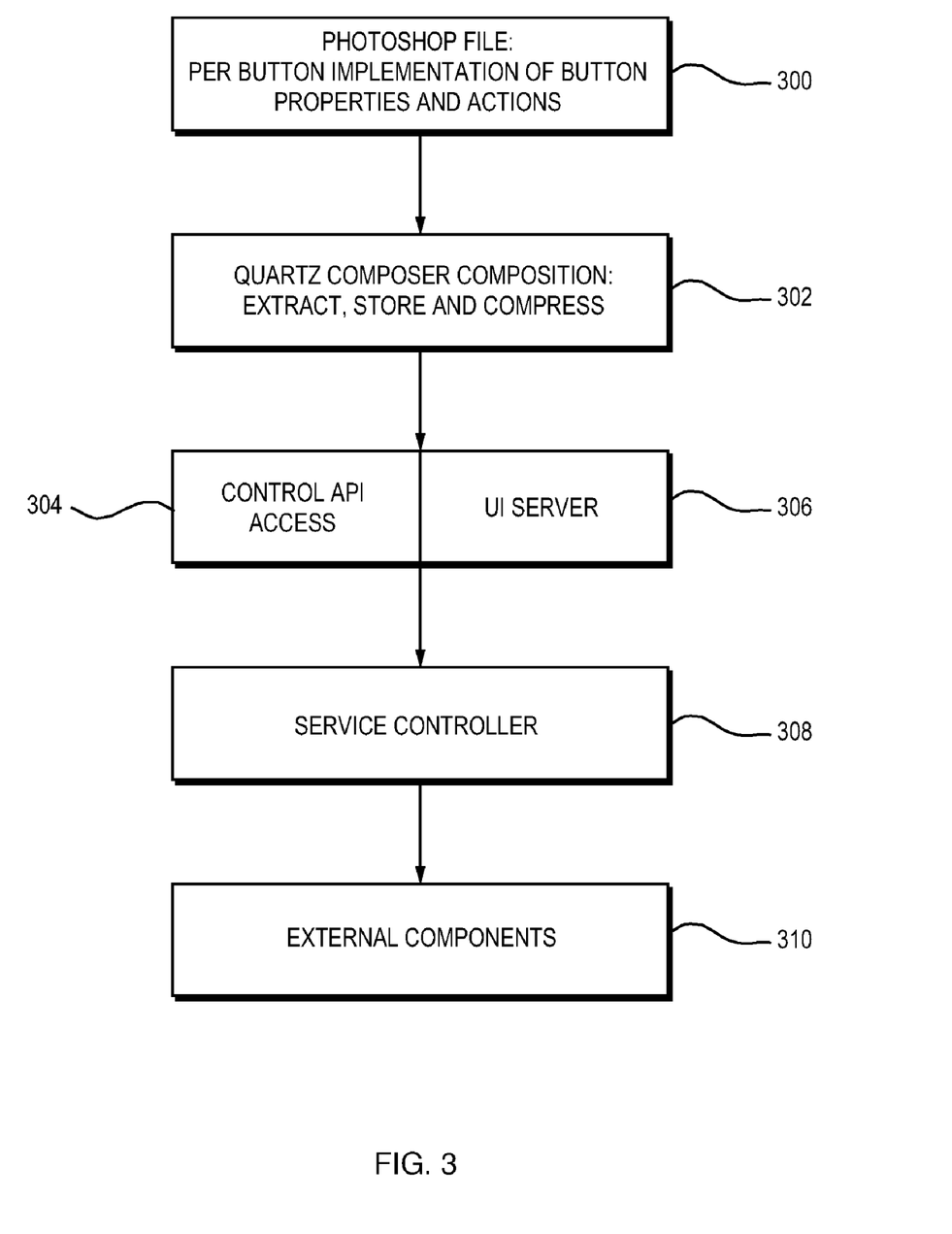
FIG. 3 is a block diagram showing a high level architecture of a system for dynamically assigning functionality to buttons in the on screen display of FIGS. 1A-1D or physical buttons of programmable remote control of FIG. 2, according to an illustrative embodiment of the present invention.

FIG. 3 is a block diagram showing a high level architecture of a system for programming both appearance and functionality of the on screen display buttons of FIGS. 1A-1D as well as the physical buttons of programmable remote control 200 of FIG. 2. In a preferred embodiment in which a Mac computer from Apple, Inc. is incorporated within a programmable multimedia controller, as described in the above-referenced related applications, Adobe Photoshop® software, which is included in Mac OS X, is used to create files 300. That is, a Photoshop® file 300 is preferably created for each menu state of each on screen button as well as each physical button.

In a preferred embodiment, each Photoshop® file 300 contains information, preferably organized in "groups" and "layers," which define the appearance, functionality and other attributes of each on screen or physical button for a given menu state. The information in a given Photoshop® file 300 may include notes, labels, text-to-speech commands, system control commands, graphics corresponding to different states of a button or other user control (e.g., enabled, pressed, mouseover), display text, font size, color, sound effect and button/control type among others.

Files 300, which are typically stored on non-volatile media such as a hard drive, are read 302 by Quartz Composer, another piece of software which is also included within Mac OS X, and a run-time environment that loads Quartz Composer compositions. Quartz Composer functions to parse Photoshop® files 300, thereby extracting all of the embedded groups and layers for the whole file and the graphics, as well as for each on screen or physical button.

Quartz Composer "patches" access the extracted information and, using a Quartz Composer function called "output ports", passes appropriate commands and information from a patch to a control application programming interface (API) access 304 and user interface (UI) server 306. Details regarding the structure and operation of control API access 304 and UI server 306 are set forth in the above-referenced related applications.

This arrangement provides a powerful programming capability because it permits an author of a Quartz Composer composition direct access to multiple layers of graphics as well as any other information stored in files 300. Stated another way, by simply altering the information contained in a file 300, an author, using widely available and familiar software, may easily and rapidly configure, modify or customize any aspect of the appearance or functionality of an on screen button or physical button.

In response to commands and information received from patches via output ports, control API access 304 and UI server 306 issue appropriate commands and information to service controller 308. Service controller 308, in turn, issues appropriate commands to external components 310 (e.g., devices which are interconnected with a programmable multimedia controller) to effect whatever action a user has indicated. Details regarding the structure and operation of service controller 308 are found in the above-referenced related applications.

Figure 4:
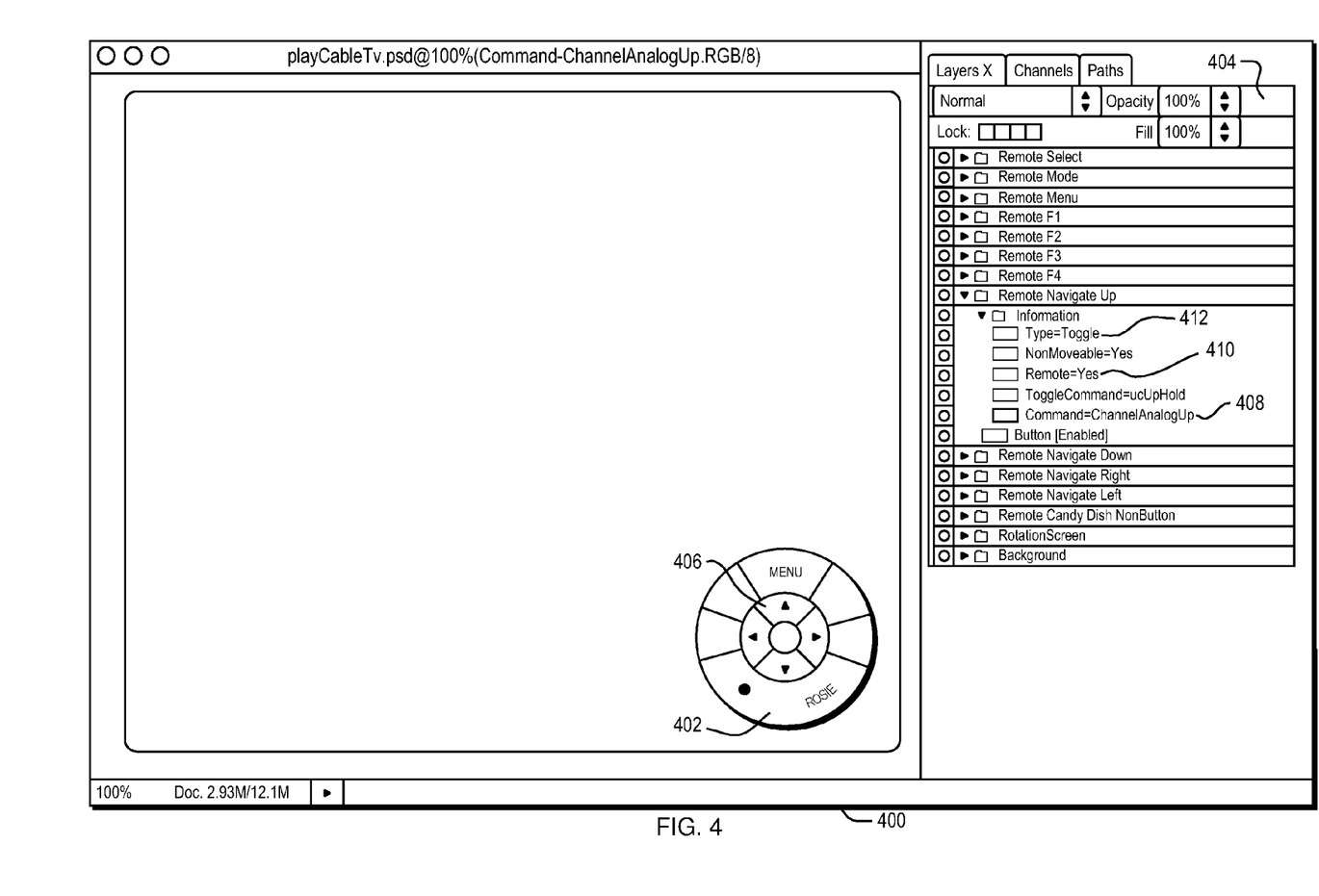
FIG. 4 is a screen shot showing how the system of FIG. 3 may be used to assign functionality to physical buttons of a programmable remote control for use with a cable TV service.

FIG. 4 is a screen shot 400 that depicts how the system of FIG. 3 may be used to assign functionality to physical buttons of a programmable remote control for use with a particular service, specifically, a cable TV service. In the central portion of screen shot 400, an image 402 of a programmable remote control, like that shown in FIG. 2, is displayed as a visual reference. In a panel 404, the "layers" of a Photoshop® file are displayed. That file defines the functionality of each physical button of the programmable remote control in connection with a particular service, which in this example is simply playing (watching) cable TV. As shown in panel 404, the physical "navigate up" button 406 is assigned the function "ChannelAnalogUp" 408 which, within the environment of a programmable multimedia controller, operates to increment the channel on a cable TV converter box. Other attributes of button 406 may also specified by the Photoshop® file. For example, button 406 is identified as a button on a remote control 410 and is designated as a toggle type 412.

To enable a user to navigate through multiple menu levels or states, a desired button on the programmable remote control may be programmed with the function "next menu." Similarly, a desired button may be programmed with the function "back" or "previous menu."

Figure 5:
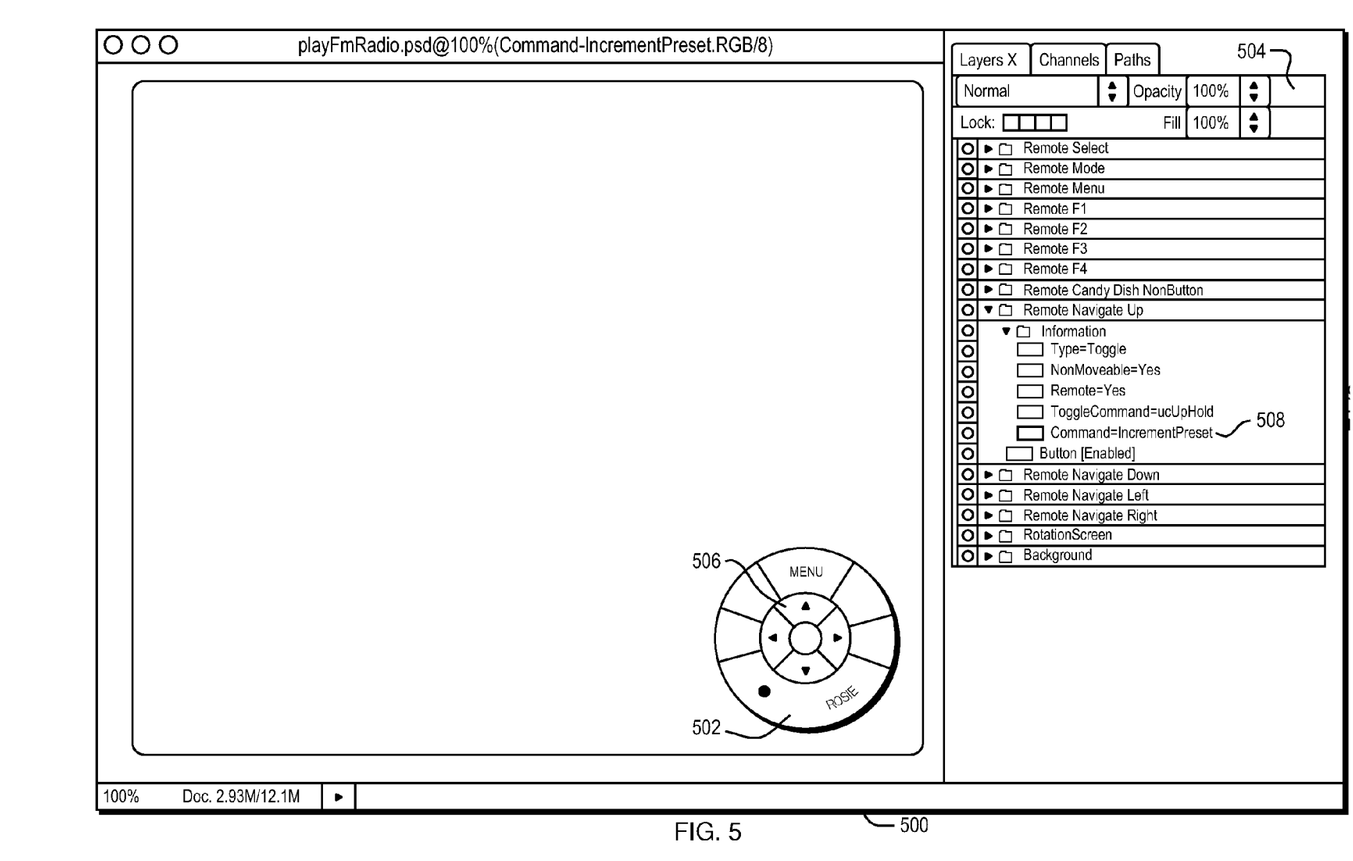
FIG. 5 is a screen shot showing how the functionality assigned a physical button of a programmable remote control may be dynamically changed in response to a user's action.

FIG. 5 is a screenshot similar to FIG. 4 which illustrates how the functionality of the "navigate up" button may be dynamically changed when the programmable remote is used in connection with a different service or menu state. In FIG. 5, the physical "navigate up" button 506 is the same physical button as the "navigate up" button 406 of FIG. 4. However, in FIG. 5, a different Photoshop® file is displayed in panel 504. This file defines functionality of each physical button of the programmable remote control in connection with playing FM radio. Here, the physical "navigate up" button 506 is assigned the function "IncrementPreset" 508 which, again within the environment of a programmable multimedia controller, operates to increment to the next preset channel on an FM tuner, audio receiver or similar device.

The foregoing description of how Photoshop® files may be used to assign and dynamically change the functionality of physical buttons on a programmable remote control is equally applicable to on screen buttons like those shown in FIGS. 1A-1D.

In the related application PROGRAMMABLE MULTIMEDIA CONTROLLER WITH PROGRAMMABLE SERVICES, there is a detailed description regarding "user profiles" and "zones." In general, user profiles are files or other data which include information on an individual user's preferences, access rights or restrictions or other information. In general, zones are particular rooms or physical areas in which particular devices are present that are interconnected with and under the control of a programmable multimedia controller. In conjunction with the graphical programming environment described in the related application entitled PROGRAMMING ENVIRONMENT AND METADATA MANAGEMENT FOR PROGRAMMABLE MULTIMEDIA CONTROLLER, the present invention may be advantageously used to provide on screen or physical button functionality which may be dynamically changed in accordance with a user profile or zone in which a user is located or both.

Figure 6:
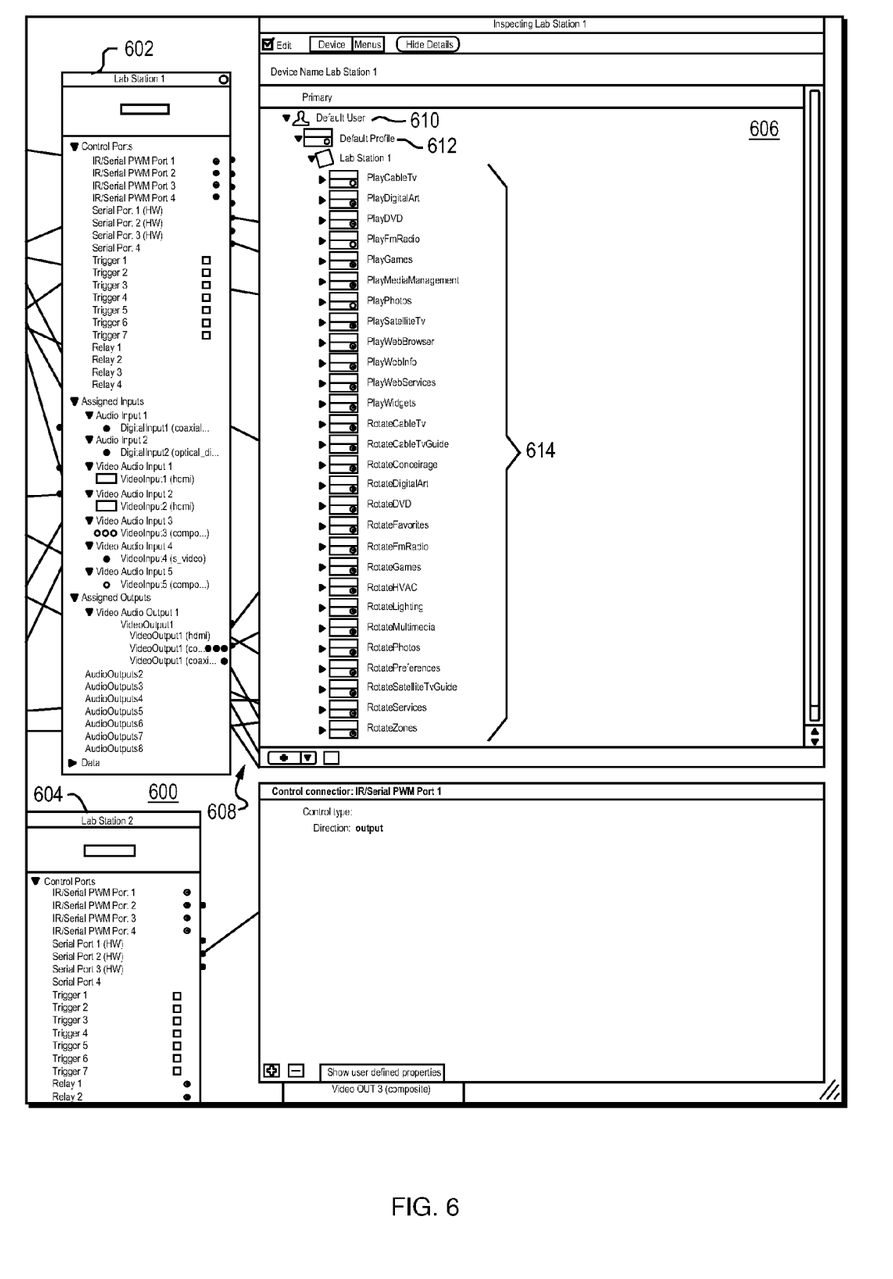
FIG. 6 is a screen shot showing a graphical programming environment in which a collection of on screen display menus are associated with a particular zone.

FIG. 6 is a screen shot of a graphical programming environment 600. A graphical representation of a zone named "Lab Station 1" is depicted in a panel 602. A partial graphical representation of a second zone named "Lab Station 2 is depicted in a panel 604. A panel 606 is a graphical representation of on screen display menus which have been programmed to appear in the Lab Station 1 zone. As indicated generally by connector lines 608, the on screen display menus in panel 606 are associated with appropriate control ports, inputs or outputs that are present in the Lab Station 1 zone. Similarly, the transitions between on screen display menus may be graphically programmed as desired.

As shown in panel 606, a user named "Default User" 610 is identified and is hierarchically associated with a user profile named "Default Profile" 612. At the next level of the hierarchy, the Lab Station 1 zone is associated with user profile 612 and, at the next level, on screen display menus 614 are associated with the Lab Station 1 zone. At the next lower level, although not visible in this figure, are the individual buttons associated with on screen menu 614. Additional user profiles may be associated with a given zone by using a mouse to select the user row and then clicking on the "+" button located at the lower left of panel 606.

The ability to associate user profiles with on screen display menus is highly advantageous in many ways. For example, a user who is lefthanded may prefer for the functionality assigned to buttons on a programmable remote control to be reversed as compared to a user who is righthanded. By specifying that preference in the user profile and dynamically adjusting the functionality assigned to on screen and physical buttons, the present invention effectively customizes and optimizes the user's experience. In another example, if the user is a child, by specifying that information in the user profile, the present invention enables the exercise of parent control to prevent certain on screen display menus from appearing, blocking access to certain media and the like.

Figure 7:
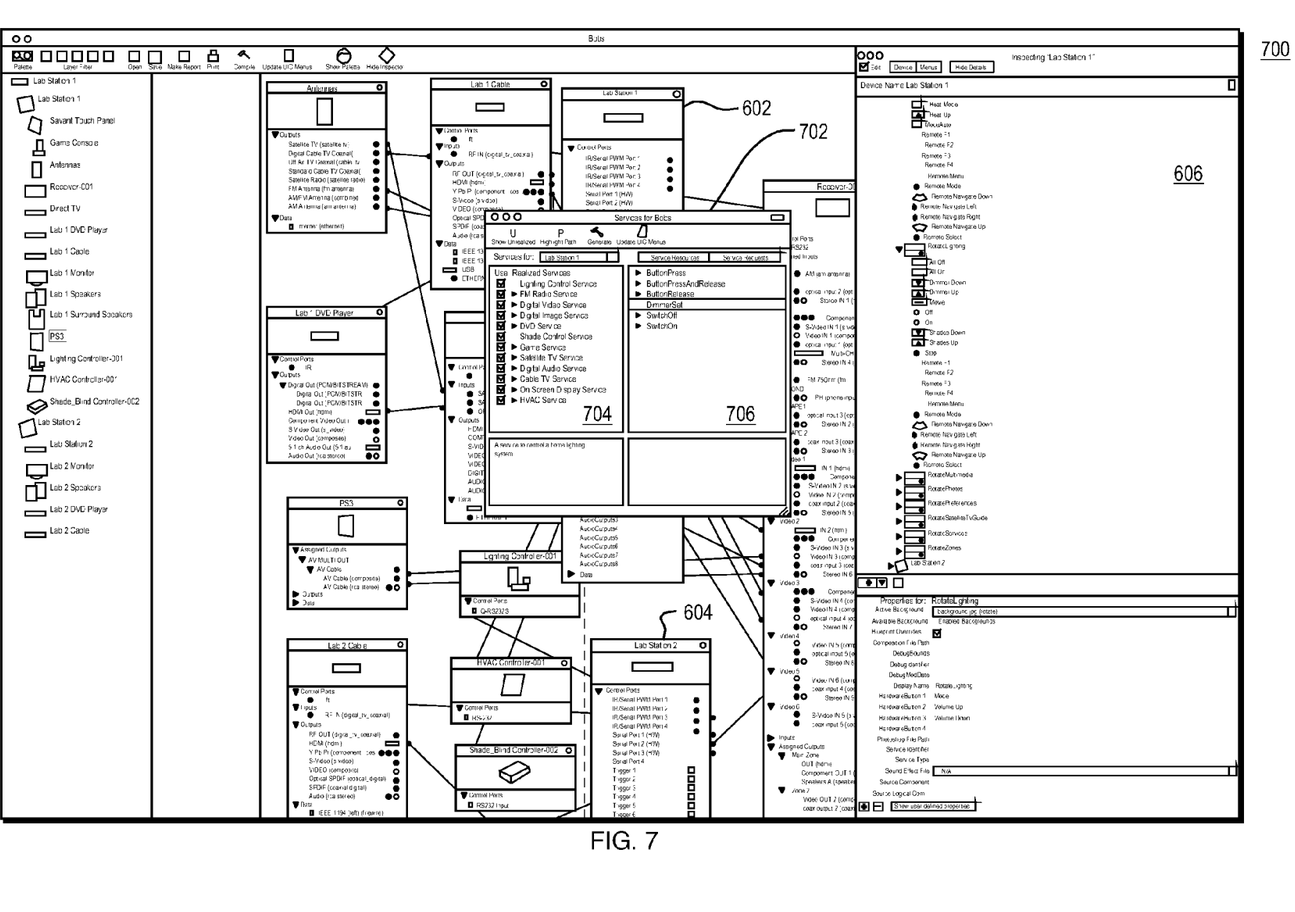
FIG. 7 is a screen shot showing a graphical programming environment in which service requests for controlling a home lighting system are presented for assignment to on screen display buttons or physical buttons on a programmable remote control.

FIG. 7 is a screen shot of a graphical programming environment 700 in which user actions, also referred to as "service requests" in the above-referenced related applications, for controlling a home lighting system (not shown) are presented for assignment to desired on screen display buttons or physical buttons on a programmable remote control.

In a dialog box 702, a lefthand portion is a list of services 704 that may be provided by a programmable multimedia controller which is interconnected with appropriate external components. The first service listed is "Lighting Control Service" which is shaded to indicate that service requests 706 listed in a righthand portion of dialog box 702 correspond to the "Lighting Control Service." As shown, the available service requests 706 are named ButtonPress, ButtonPressAndRelease, ButtonRelease, DimmerSet, SwitchOff and SwitchOn. Stated another way, the available service requests 706 represent actions that a user may take in connection with the "Lighting Control Service" which will be recognized by the programmable multimedia controller as valid actions.

Any of the service requests 706 may be assigned to any of the on screen display buttons or physical buttons on a programmable remote control that appear in panel 606, which is the same panel shown in FIG. 6 except that the on screen display menu named "RotateLighting" is now expanded and displayed. To assign a particular service request to a particular button, one simply uses a mouse to drag the service request 706 and drop it on the desired button 606.

Figure 8:
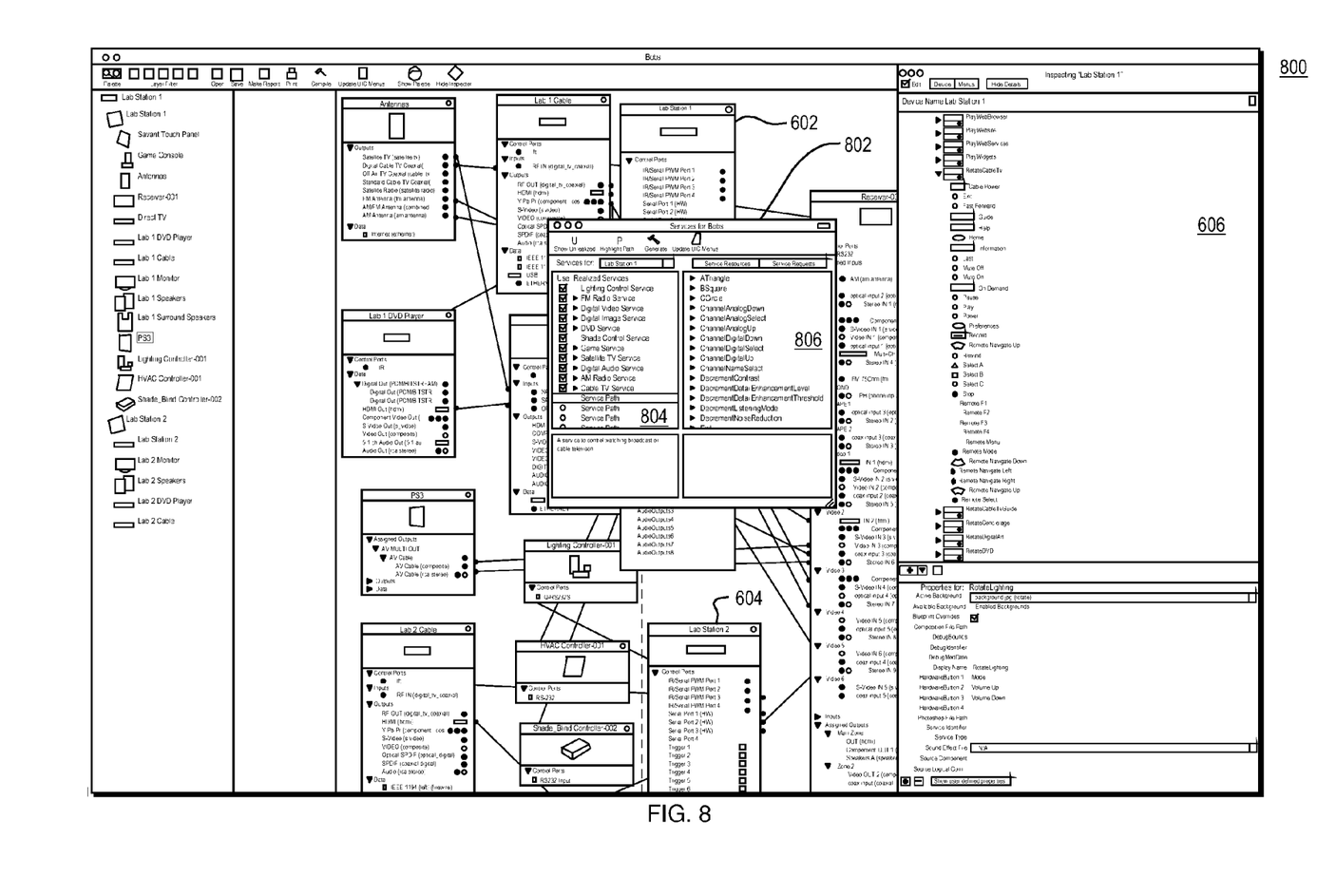
FIG. 8 is a screen shot showing a graphical programming environment in which service requests for controlling cable TV are presented for assignment to on screen display buttons or physical buttons on a programmable remote control.

FIG. 8 shows a graphical programming environment 800 in which service requests 806 for controlling a cable TV service 804 are presented for assignment to desired on screen or physical buttons. As described above, any service request 806 may be assigned to any button present in panel 606 by a drag and drop operation. An on screen display menu named RotateCableTv is expanded and displayed in panel 606.

Figure 9:
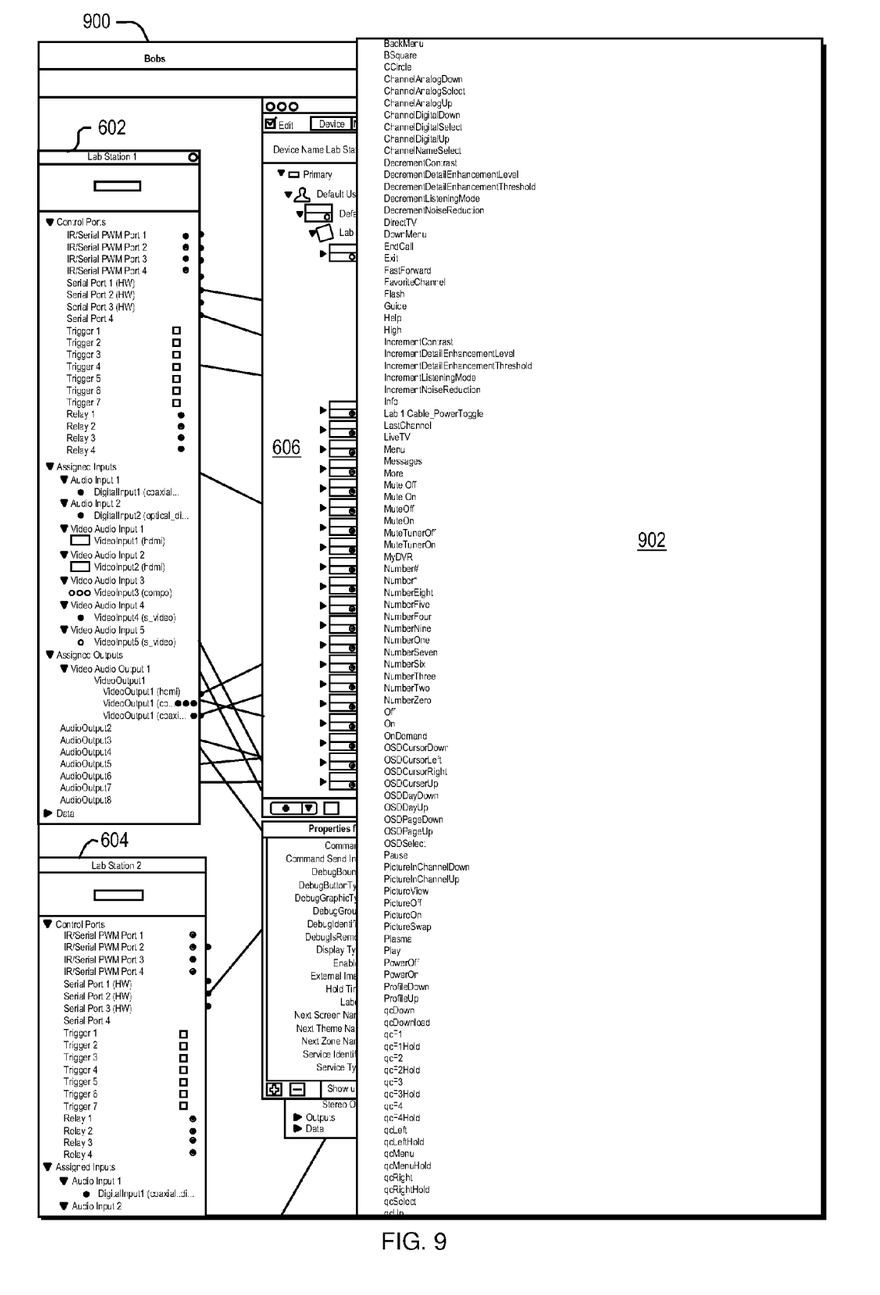
FIG. 9 is a screen shot showing a graphical programming environment in which all possible commands for controlling a cable TV converter box are presented for assignment to on screen display buttons or physical buttons on a programmable remote control.

FIG. 9 shows a graphical programming environment 900 depicting an alternative method for assigning a user command to an on screen display button or physical button. A panel 902 presents a list of all possible user commands 902 for controlling a cable TV converter box. Similar lists (not shown) may be provided for any desired group of devices (e.g., receivers, DVD players, TVs, etc.) up to an including a master collection of all devices for which necessary information can be collected. With panel 902 displayed, any of the listed commands may be assigned to any on screen display button or physical button in panel 606 by a drag and drop operation.

The foregoing description has been directed to particular embodiments of this invention. It will be apparent, however, that other variations and modifications may be made to the described embodiments, with the attainment of some or all of their advantages. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method comprising the steps of:
defining functions that a user may initiate by pressing buttons on a physical remote control;
storing information representing said functions;
using a graphical programming environment to assign a function to at least one of said buttons based on a user profile which corresponds to said user and that includes information regarding said user's preferences, said function to be indicated in a first graphics file with layers of graphics that indicate said function is assigned to said at least one of said buttons, said function to be performed when said at least one of said buttons is pressed in connection with a first predetermined on screen display being shown on a display device separate from the physical remote control;
using the graphical programming environment to assign a different function to said at least one of said buttons based on said user profile, said different function to be indicated in a second graphics file with layers of graphics that indicate said different function is assigned to said at least one of said buttons, said different function to be performed in response to said user navigating with said physical remote control to a second predetermined on screen display shown on said display device separate from the physical remote control and said user pressing said at least one of said buttons in connection with said second predetermined on screen display being shown;
using software to parse said first graphics file or said second graphics file to extract the layers of graphics that indicate said function or said different function is assigned to said at least one of said buttons; and
passing commands to an application programming interface (API) to cause said function or said different function to be performed.

2. The method as in claim 1 wherein said user profile includes information regarding services which said user is authorized to access using said physical remote control.

3. The method as in claim 1 wherein said user profile includes information regarding whether said user has a handicap.

4. The method as in claim 1 wherein said user profile includes information regarding parental controls applicable to said user.

5. The method as in claim 1 wherein said function is dependent upon said user's physical location.

6. The method as in claim 1 wherein said different function is dependent upon said user's physical location.

7. The method as in claim 1 wherein said function is dependent upon said user's selection of a predetermined service provided by a programmable multimedia controller.

8. A method comprising the steps of:
defining functions that a user may initiate by interacting with one or more on screen displays shown on a display device;
storing information representing said functions;
using a graphical programming environment to assign a function to at least one user-operable control that appears in said one or more on screen displays based on a user profile which corresponds to said user and that includes information regarding said user's preferences, said function to be indicated in a first graphics file with layers of graphics that indicate said function is assigned to said at least one user-operable control that appears in said one or more on screen displays shown on said display device;
using the graphical programming environment to assign a different function to said at least one user-operable control that appears in said one or more on screen displays based on said user profile, said different function to be indicated in a second graphics file with layers of graphics that indicate said different function is assigned to said at least one user-operable control that appears in said one or more on screen displays shown on said display device, said different function to be performed in response to said user navigating through said one or more on screen displays shown on said display device;
using software to parse said first graphics file or said second graphics file to extract the layers of graphics that indicate said function or said different function is assigned to said at least one user-operable control; and passing commands to an application programming interface (API) to cause said function or said different function to be performed.

9. The method as in claim 8 wherein said user profile includes information regarding services which said user is authorized to access using said one or more on screen displays.

10. The method as in claim 8 wherein said user profile includes information regarding whether said user has a handicap.

11. The method as in claim 8 wherein said user profile includes information regarding parental controls applicable to said user.

12. The method as in claim 8 wherein said at function is dependent upon said user's physical location.

13. The method as in claim 8 wherein said different function is dependent upon said user's physical location.

14. The method as in claim 8 wherein said function is dependent upon said user's selection of a predetermined service provided by a programmable multimedia controller.

15. A programmable multimedia system comprising:
a programmable multimedia controller including a general purpose computer and coupled to a display device;
said display device configured by the programmable multimedia controller to show one or more on screen displays which include one or more user-operable controls for commanding said programmable multimedia controller;
a graphical programming environment configured to assign a function to at least one of said one or more user-operable controls using a user profile which corresponds to said user and that includes information regarding said user's preferences, said function to be indicated in a first graphics file with layers of graphics that indicate said function is assigned to said at least one user-operable control and is performed in response to said user operating said at least one user-operable control, and to assign a different function to said at least one user-operable control using said user profile, said different function to be indicated in a second graphics file with layers of graphics that indicate said different function is assigned to said at least one user-operable control and is performed in response to said user navigating through said one or more on screen displays shown on said display device; and
software configured to parse said first graphics file or said second graphics file to extract the layers of graphics that indicate said function or said different function is assigned to said at least one user-operable control, and pass commands to said programmable multimedia controller to cause said function or said different function to be performed.

16. A programmable multimedia system comprising:
a programmable multimedia controller including a general purpose computer and coupled to a display device;
said display device configured by the programmable multimedia controller to show on screen displays for commanding said programmable multimedia controller;
a physical remote control separate from the programmable multimedia controller and said display device, said physical remote control having physical buttons usable in conjunction with said on screen displays shown on said display device; and
a graphical programming environment configured to assign a function to at least one of said physical buttons using a user profile which corresponds to said user and that includes information regarding said user's preferences, said function to be indicated in a first graphics file with layers of graphics that indicate said function is assigned to said at least one physical button and is performed in response to said user operating said at least one physical button on said physical remote control, and to assign a different function to said at least one physical button based on said user profile, said different function to be indicated in a second graphics file with layers of graphics that indicate said different function is assigned to said at least one physical button and is performed in response to said user navigating through said on screen displays shown on said display device and said user pressing said at least one physical button; and
software configured to parse said first graphics file or said second graphics file to extract the layers of graphics that indicate said function or said different function is assigned to said at least one physical button, and pass commands to said programmable multimedia controller to cause said function or said different function to be performed.

* * * * *